United States Patent Office 2,832,312
Patented Apr. 29, 1958

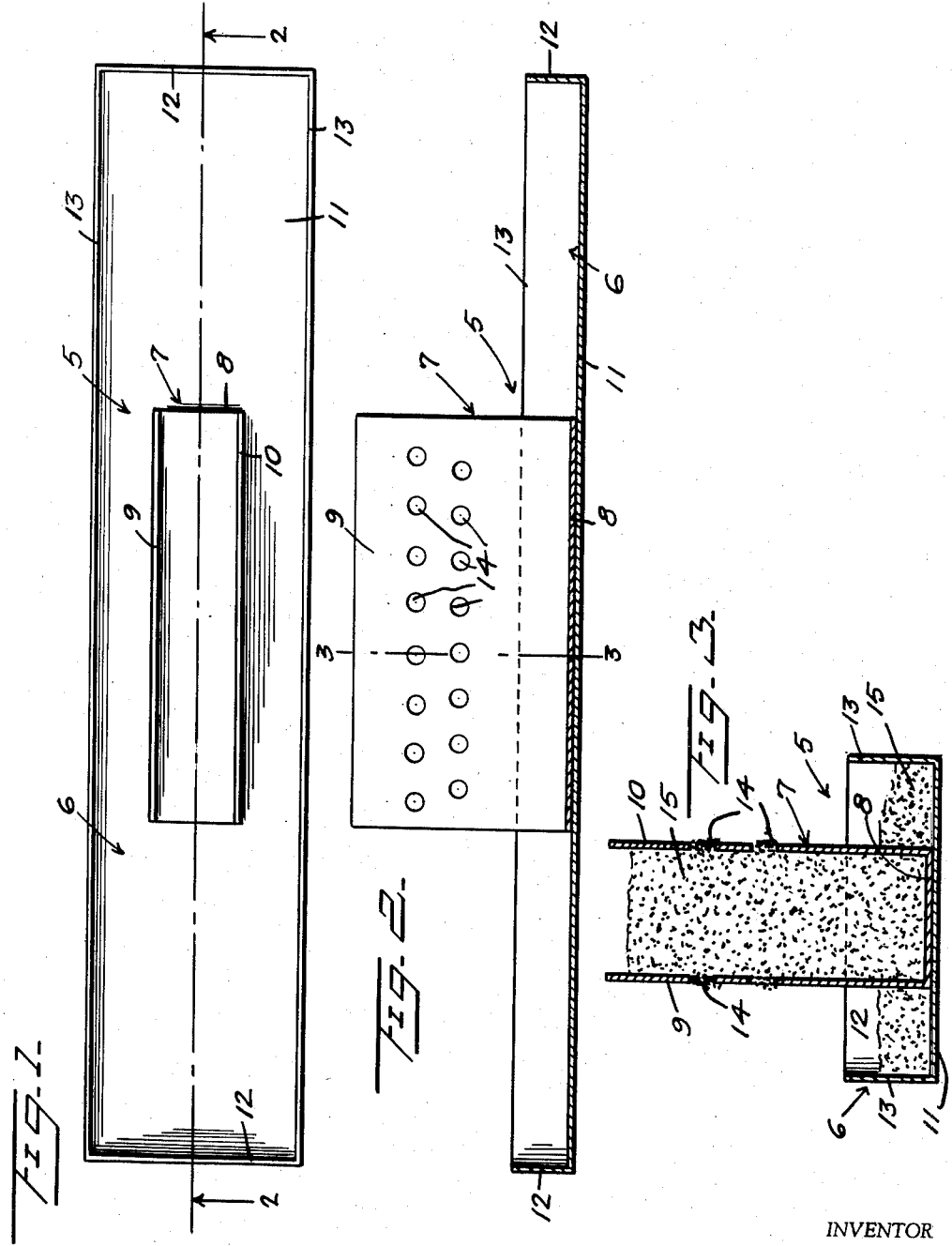

2,832,312

FEEDER FOR YOUNG POULTRY

William M. Bowerman, Holland, Mich.

Application August 6, 1956, Serial No. 602,371

3 Claims. (Cl. 119—61)

This invention relates to an improved feeder for young poultry and more particularly to a feeder for use by turkey poults and which has proved very effective in substantially reducing the mortality rate among turkey poults, especially very young poults.

There is a natural tendency for turkey poults to pick at any small opening which can be seen.

Accordingly, it is a primary object of the present invention to provide a feeder having spaced upstanding walls providing a channel therebetwen adapted to be filled with feed and having small apertures formed in said walls to which the turkey poults will be attracted and from which the poults can obtain a mouthful of feed in picking at the apertures.

Another object of the invention is to provide such a feeding accessory having an open top disposed at a sufficiently low level so that turkey poults can walk upon the feed contained between the walls, thus agitating the feed to cause some of the feed to be discharged outwardly through the apertures for attracting the attention of the other turkey poults.

A further object of the invention is to provide such a feeding device which is adapted for use as an attachment to or an accessory of a shallow trough.

Another object of the invention is to provide such an attachment or accessory wherein light rays will be visible through the openings or apertures so that said apertures will appear as shiny spots which will attract the turkey poults.

A further object of the invention is to provide a feeder of the aforedescribed character which may be easily maintained in a clean and sanitary condition, which may be readily filled, the use of which will result in a minimum of waste, and which will materially increase the capacity of feeders of the type ordinarily employed for feeding young poultry.

Various other objects and advantages of the invention will hereinafter become more fully apparent from the following description of the drawing, illustrating a presently preferred embodiment thereof, and wherein:

Figure 1 is a top plan view of the poult feeder;

Figure 2 is a longitudinal sectional view thereof, taken substantially along a plane as indicated by the line 2—2 of Figure 1, and Figure 3 is an enlarged cross sectional view through the feeder, taken substantially along a plane as indicated by the line 3—3 of Figure 2.

Referring more specifically to the drawing, the feeder in its entirety is designated generally 5 and is illustrated as comprising an elongated relatively shallow trough 6 and an auxiliary feed container, designated generally 7. The auxiliary feed container 7 is preferably channel shaped in cross section and includes a bottom portion 8 and spaced substantially parallel upstanding walls 9 and 10. The bottom 8 of the accessory or feed container attachment 7 is suitably secured to the upper side of the bottom 11 of the trough 6 and longitudinally thereof. The accessory 7 is preferably disposed approximately midway between the end walls 12 and likewise approximately midway between the side walls 13 of the trough 6 and is of a length and width so as to be spaced a substantial distance from the ends of the trough 6 and also a substantial distance from the side walls 13. The side walls 9 and 10 of the accessory extend upwardly to substantially above the level of the upper edges of the trough walls 12 and 13, as seen in Figures 2 and 3. Said walls 9 and 10, which preferably correspond with one another, are each provided with a plurality of small openings 14 which may be arranged in vertically spaced rows above the level of the trough walls 12 and 13.

The trough 6 is filled with feed 15, as seen in Figure 3, to a proper level to minimize the loss of feed over the upper edges of the trough walls. In addition, the accessory 7 is filled with feed 15 to above the level of the uppermost openings 14 of the walls 9 and 10 thereof, as seen in Figure 3.

Young poultry, especially turkey poults, possess a natural tendency to pick at small openings and the openings 14 are disposed at levels so that the poults, not shown, may readily pick at said openings and in doing so will obtain a mouthful of feed. Additionally, some of the feed 15 within the accessory 7 will escape through the openings 14 into the trough 6 and in so doing will attract the poults thereto. Additionally, the upper edges of the walls 9 and 10 are disposed at a sufficiently low elevation so that turkey poults can walk about in the top of the accessory 7 to agitate and cause the feed to flow through the openings 14 for attracting other turkey poults thereto. Light rays will also shine through the openings 14, as the feed 15 becomes loose in the accessory 7, producing bright spots which the turkey poults are attracted to and pick at. It will also be apparent that the accessory 7 materially increases the capacity of the feeder 5 over the normal capacity of the trough 6.

The feeder 5 thus provides a device which attracts young poultry, especially turkey poults, causing a greater amount of feed to be consumed and tending to encourage reluctant eaters to feed so that the number of young poultry that normally die from starvation is reduced to a minimum.

It will be readily obvious that the feeder 5 may be made in various sizes and that the accessory 7 thereof may be utilized with shallow troughs of various shapes. It will also be apparent that the primary function of the accessory bottom 8 is to maintain the walls 9 and 10 in spaced substantially parallel relation to one another and to facilitate the securement of the accessory to the trough bottom 11. Accordingly, the accessory bottom 8 could be dispensed with and the bottom edges of the walls 9 and 10 could be suitably secured directly to the trough bottom 11. The parts forming the trough 6 and accessory 7 may be formed of various materials including metal, plastic and heavy paper stock.

It will also be obvious that the feeder 5 is so constructed that it can be readily cleaned and maintained in a sanitary condition and may be easily filled with the feed 15 which will be so maintained therein that the waste of feed therefrom will be reduced to a minimum.

Various modifications and changes are contemplated and may be resorted to without departing from the function or scope of the invention as hereinafter defined by the appended claims.

I claim as my invention:

1. A feeder for young poultry comprising a relatively shallow open top receptacle adapted to contain feed, a pair of walls fixed to and rising from the receptacle bottom and extending to substantially above the level of the open top of said receptacle and forming a channel there-between adapted to be filled with feed, said walls having a plurality of apertures formed therein above the level of the open top of the receptacle and through which the feed contained between said walls is discharged and may be extracted, the channel formed by said walls having open ends.

2. A feeder for young poultry comprising an elongated relatively shallow trough adapted to contain feed and a relatively deep channel shaped accessory having a bottom secured to the upper side of the trough bottom and upstanding side walls extending to substantially above the level of the open top of the trough, said side walls being disposed in spaced apart relation to one another to form a relatively deep channel adapted to be filled with feed, and at least one of said accessory walls having a plurality of small openings disposed above the level of the open top of the trough and through which the feed contained in said channel will flow outwardly into the trough and can be extracted.

3. A feeder as in claim 2, said accessory being spaced from the trough walls and having open ends.

References Cited in the file of this patent

UNITED STATES PATENTS

| | | |
|---|---|---|
| 1,220,441 | Mendel | Mar. 27, 1917 |
| 1,610,614 | McCollough | Dec. 14, 1926 |
| 1,959,099 | Gingrich | May 15, 1934 |
| 2,667,858 | Cussotti | Feb. 2, 1954 |